(No Model.)  
2 Sheets—Sheet 1.

F. GALE.
WOOD POLISHING MACHINE.

No. 325,527.  Patented Sept. 1, 1885.

WITNESSES  
INVENTOR  
Franklin Gale  
By his Attorneys (No Model.) 2 Sheets—Sheet 2.

F. GALE.
WOOD POLISHING MACHINE.

No. 325,527. Patented Sept. 1, 1885.

WITNESSES

INVENTOR
Franklin Gale
By his Attorneys.

UNITED STATES PATENT OFFICE.

FRANKLIN GALE, OF MUSKEGON, MICHIGAN.

WOOD-POLISHING MACHINE.

SPECIFICATION forming part of Letters Patent No. 325,527, dated September 1, 1885.

Application filed June 20, 1884. (No model.)

*To all whom it may concern:*

Be it known that I, FRANKLIN GALE, a citizen of the United States, residing at Muskegon, in the county of Muskegon and State of Michigan, have invented a new and useful Wood-Polishing Machine, of which the following is a specification, reference being had to the accompanying drawings.

My invention relates to an improvement in wood-polishing machines, and is particularly adapted for use in polishing the handles of agricultural implements, such as hoes, rakes, &c.; and it consists in the peculiar construction and combination of devices that will be more fully set forth hereinafter, and particularly pointed out in the claims.

Figure 1:
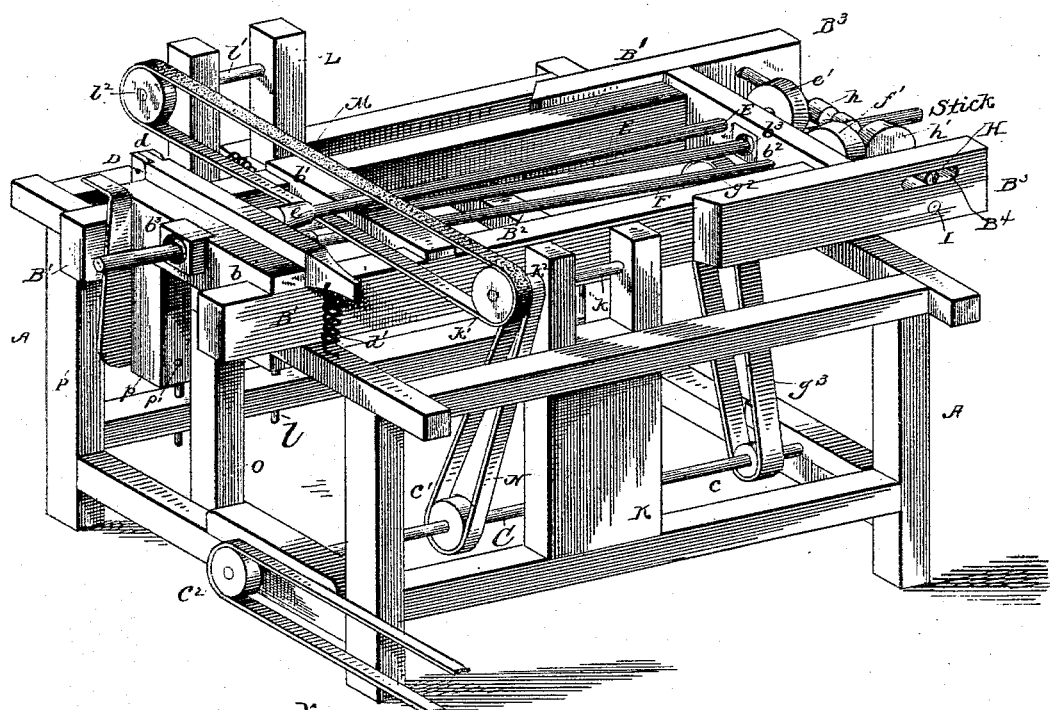
Figure 2:
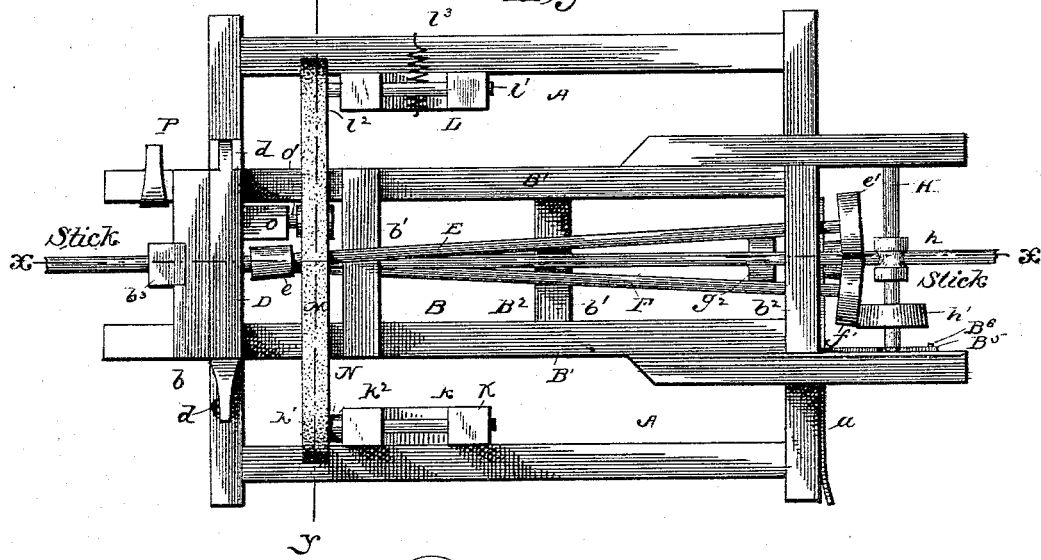
Figure 3:
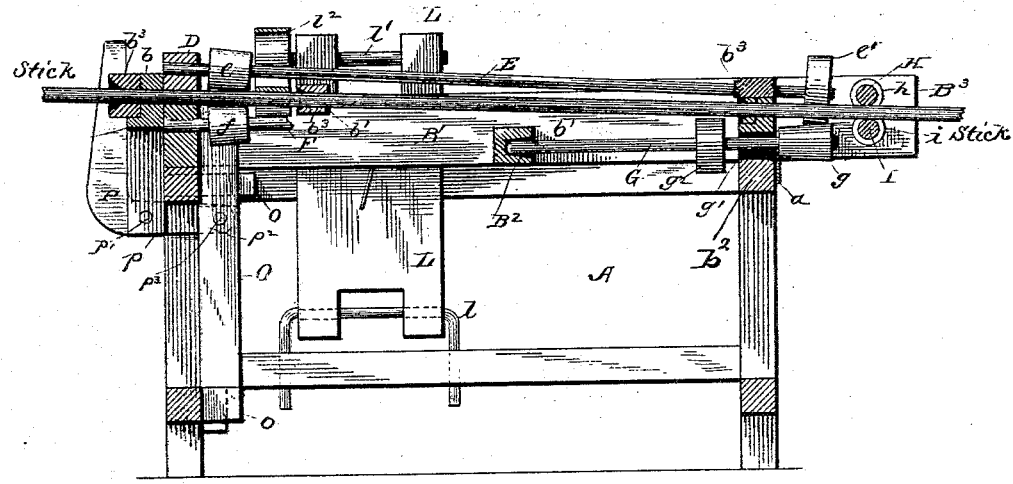
Figure 4:
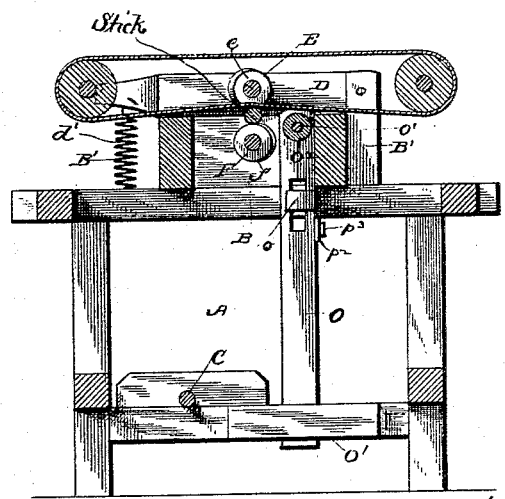
Figure 5:
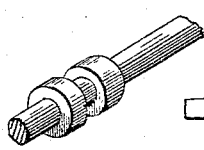
Figure 6:
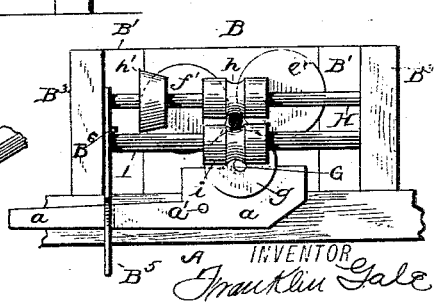

In the accompanying drawings, Figure 1 is a perspective of my invention. Fig. 2 is a top plan view of the same. Fig. 3 is a vertical longitudinal section taken on the line $x\ x$ of Fig. 2. Fig. 4 is a vertical cross-section taken on the line $y\ y$ of Fig. 2. Fig. 5 is a detail view of a modified form of feeding-roller that is to be used when polishing short sticks. Fig. 6 is a rear end elevation.

A represents a rectangular frame on which is secured a bed-frame, B. This bed-frame consists of the longitudinal side beams, B', and the cross or tie beams $b$, $b'$, and $b^2$, which are provided each with a die, $b^3$, and a cross or tie beam, B². A shaft, C, is journaled in the frame A, and is provided with the pulleys $c$, $c'$, and $c^2$, which latter is the driving-pulley that actuates the machine.

D represents a bar that is adjacent to the beam $b$, is pivoted to the bed-frame at one end, as at $d$, and has a spring, $d'$, secured to its free end, which spring keeps the bar normally in contact with the upper side of the bed-frame, as shown.

E represents a shaft that is journaled at one end centrally in the pivoted bar D and passes over the beam $b'$, and has its rear end journaled in the beam $b^2$, near one side of the bed-frame. A similar shaft, F, has its front end journaled in the beam $b$, below and in a vertical line with the front end of the shaft E, and has its rear end journaled in the beam $b^2$, near the side of the bed-frame that is opposite to the rear end of the shaft E. It will be seen that the front ends of these shafts are in the same vertical line, and that they diverge rearwardly from each other. The shaft E is provided with a feeding-roller, $e$, near its front end, and has a friction-wheel, $e'$, secured to its rear protruding end, and a similar feeding-roller, $f$, and friction-wheel $f'$ are secured to the shaft F, as shown.

To the rear end of the frame A is fulcrumed a bent lever, $a$, as at $a'$, and in the upper extending arm of this bent lever is journaled the rear end of a shaft, G, which has a friction-wheel, $g$, that bears against the friction-wheels $e'$ and $f'$. A slot, $g'$, is made in the beam $b^2$ to allow vertical play to the shaft G, and the front end of the shaft is journaled in the cross-beam B². A pulley, $g^2$, is attached to this shaft and is connected to the pulley $c$ on the driving-shaft C by means of a belt, $g^3$. By having the rear end of the shaft G journaled in the pivoted bent lever $a$, the wheel $g$ can be brought to bear against the wheels $e'$ and $f'$, so as to rotate the roller-shafts, or said wheel $g$ can be lowered out of contact with said wheels, as will be very readily understood.

B³ represents rearwardly-extending brackets that are secured to the outer sides of the beams B'. In the rear ends of these brackets are journaled the transverse shafts H and I. The shaft I is provided at its center with a grooved roll, $i$, and the shaft H has a similar grooved roll, $h$, and a friction-wheel, $h'$, that bears against the friction-wheel $f'$.

To one side of the frame A, near its front end, is fixed a vertical standard, K, in the upper end of which is journaled a shaft, $k$, having pulleys $k'\ k^2$. A similar standard, L, is hinged at its lower end to the opposite side of the frame A, as at $l$, and in the upper end of the hinged standard is journaled a shaft, $l'$, that is provided with a pulley, $l^2$. A retractile spring, $l^3$, which is secured to the frame A and to the hinged standard, keeps the latter normally in a vertical position. A belt, M, connects the pulleys $k'$ and $l^2$, and a belt, N, connects the pulleys $k^2$ and $c'$.

O represents a standard that is adapted to slide vertically, being directed by guides $o$, that are bolted to the inner side of the front end of the frame A, adjacent to one side of the bed-frame, and from the upper rear side of this sliding standard projects a short spindle, $o'$, on which is journaled a roller, $o^2$.

A bent lever, P, is fulcrumed to a depending bracket, $p$, from the front side of the bed-frame, as at $p'$, and the rearwardly-extending arm $p^2$ of said lever is pivoted to the standard O, as at $p^3$. By grasping the free end of the bent lever the standard O may be raised or lowered, so as to cause the roller $o^2$ to bear against the under side of the belt M for the purpose of raising the belt from the stick, or to be lowered out of contact therewith, as will be very readily understood.

One end of the shaft H is journaled in a slot, $B^4$, and a bent lever, $B^5$, is fulcrumed, as at $B^6$, and serves to bring the wheel $h'$ in or out of contact with the wheel $f'$.

The operation of my invention is as follows: Motion being imparted to the machine, the stick to be polished is fed through the die $b^3$ of the front cross-beam, $b$, which directs it between the feeding-rollers, by which the stick is rapidly rotated, and owing to the angle at which these rollers are placed with reference to each other, as previously fully described, the stick is slowly forced rearwardly from said rollers and is brought in contact with the under side of the rapidly-moving belt M, which polishes the stick. As the rear end of the stick moves past the polishing-belt, it enters the die in the beam $b'$, which directs it to the die in the beam $b^2$, and when the rear end of the stick moves outwardly beyond the rear side of the beam $b^2$ a slight distance it passes between the grooved drawing-rolls $h$ and $i$, and is by said rolls drawn through the dies after it has ceased to be rotated by the feeding-rollers $e\ f$, and discharged from the machine.

Having thus described my invention, I claim—

1. The combination, in a wood-polishing machine, of a frame, feeding-rollers that are fixed on diverging shafts, one of which has stationary bearings and the other having one of its bearings in a pivoted lever, a spring for bearing down the free end of the lever, a die for directing the stick to be polished, and a polishing-belt, substantially as described.

2. The combination, in a wood-polishing machine, of a frame, feeding-rollers journaled therein, a die for directing the stick to be polished, a polishing-belt having one of its actuating-pulleys journaled in a fixed standard, the other pulley being journaled in a hinged standard, a spring bearing against the hinged standard, and a friction-roller that is journaled to a vertically-moving support and adapted to raise the under side of the polishing-belt out of contact with the stick, substantially as described.

In testimony that I claim the foregoing as my own I have hereto affixed my signature in presence of two witnesses.

FRANKLIN GALE.

Witnesses:
 ASHFORD WOOD,
 DAVID ANDREWS.